United States Patent [19]
Hamilton, Jr.

[11] Patent Number: 5,253,534
[45] Date of Patent: Oct. 19, 1993

[54] CALIBRATOR FOR GRANULAR BROADCAST SPREADERS (IMPELLER; WALK-BEHIND SPINNER-TYPE)

[76] Inventor: George W. Hamilton, Jr., 1617 Regina Cir., State College, Pa. 16803

[21] Appl. No.: 760,521

[22] Filed: Sep. 16, 1991

[51] Int. Cl.$^5$ .............................................. G01F 25/00
[52] U.S. Cl. .......................................... 73/861; 73/3; 177/50
[58] Field of Search .................... 73/3, 1 R, 865.9, 861; 177/50

[56] References Cited

U.S. PATENT DOCUMENTS

| | | | |
|---|---|---|---|
| 3,451,252 | 6/1969 | Horton et al. | 239/65 X |
| 4,106,704 | 8/1978 | McRoskey et al. | 222/625 X |
| 4,234,105 | 11/1980 | Viramontes | 222/623 X |
| 4,409,845 | 10/1983 | Stafflebam et al. | 73/861 |
| 4,422,562 | 12/1983 | Rawson | 222/625 X |
| 4,465,211 | 8/1984 | van der Lely et al. | 222/77 X |
| 4,491,023 | 1/1985 | Graef | 73/861 |
| 4,570,491 | 2/1986 | Machnee | 73/861 |
| 4,667,503 | 5/1987 | Loos | 73/3 |
| 4,693,122 | 9/1987 | Griffith | 73/861 |
| 4,716,768 | 1/1988 | David et al. | 222/71 X |

*Primary Examiner*—Tom Noland
*Attorney, Agent, or Firm*—Thomas J. Monahan

[57] ABSTRACT

A calibrating device for use with centrifugal, pendulum or other types of broadcast spreaders which distribute dry granular materials to be soil for agricultural purposes is described. The device provides containment of granular materials while the spreader operates without hindrance over a predetermined distance. The invention permits the rapid and efficient calibration of broadcast spreaders and thus ensures that optimal application rates of agricultural materials will be delivered with attendant cost savings and other operational advantages.

8 Claims, 3 Drawing Sheets

CALIBRATOR FOR GRANULAR BROADCAST SPREADERS (IMPELLER; WALK-BEHIND SPINNER-TYPE)

BACKGROUND OF THE INVENTION

The present invention relates to equipment for use with centrifugal, pendulum and other types of broadcast spreaders which distribute dry granular agricultural materials to the soil.

By way of background, a wide variety of equipment is used to apply agricultural materials to the soil surface for use in the cultivation of field crops or for various agricultural purposes. Typically, such applicators are used to spread seeds, pesticides, and/or fertilizers. Applicators have adjustable controls for regulating the rates at which materials are dispensed. Large-scale farming applicators of solid materials or liquid formulations are often pulled by tractors or other power sources over fields. Agricultural spreaders for small-scale applications are usually hand propelled or self-propelled by small engines.

In the case of seed, pesticide or fertilizer applications, optimum or recommended rates of application are generally known. Under-applications of seed result in reduced crops and over-applications are wasteful and expensive or may actually result in reduced yields. In the case of pesticides, proper application amounts are desired for effective control or elimination of weeds, plant diseases, and various insect and plant pathogens. Under-application of pesticides may not provide the proper control and over-application can result in crop damage, unnecessary expense, environmental harm, or injury or risk of injury to application personnel. Similarly, misapplication of fertilizer can have cost implications and result in crop damage or reduced yields as well as potential environmental problems. Agricultural organic chemicals must be handled and applied with great care. Also, the cost of agricultural chemicals has markedly increased in recent years. Avoidance of errors in application is a major economic concern to farmers as well as the agriculture industry.

The literature is replete with various methods and devices related to the delivery and calibration of agricultural spreaders including weighing systems between a tractor and a spreader (U.S. Pat. No. 4,465,211), devices for use with liquid sprayers (U.S. Pat. Nos. 3,451,252; 4,491,023; and 4,409,845), and a row planter calibration (U.S. Pat. No. 4,693,122). Griffith presents a review of the volumetric calibration of planting and agricultural equipment. In addition, a standard method of determining and reporting performance data using broadcast spreaders designed to apply granular materials on the soil is available (ASAE Standard 5341, "Procedure for Measuring Distribution Uniformity and Calibrating Granular Spreaders," 1989).

In the treatment of turfgrass by homeowners and commercial personnel, the two most common types of granular applicators are (i) the gravity or drop-type spreaders; and (ii) the centrifugal or rotary spreaders. The centrifugal or rotary broadcast spreaders are particularly difficult to calibrate, especially for homeowners, when contrasted to the gravity or drop-type spreaders.

The methods for calibrating centrifugal or rotary broadcast spreaders are cumbersome and laborious. Two methods of calibration are most commonly employed. In one method, a known amount of material is put into the spreader and delivered to a known area. The material remaining in the spreader is weighed and the weight of the distributed material determined. The amount of material distributed per unit area is then determined. The procedure is repeated with varied spreader settings until the desired rate is obtained. Disadvantages of this method are that large amounts of material must be handled, material is wasted, the spreader must be inverted to empty the hopper with considerable difficulty, increased danger of exposure to material of the operator and to the environment, and the method is time consuming.

Another method for calibrating rotary broadcast spreaders involves spreading material over a known area of a smooth impervious surface. The spread material is then collected by sweeping and weighed. The application rate per unit area can then be calculated. This procedure is then repeated with changes in spreader setting until the desired rate is obtained. This method is limited by errors introduced by not collecting all dispensed material and/or collecting contaminants, by the danger of exposing the operator and the workplace to material, and by procedural time requirements.

The present invention overcomes the above-described disadvantages inherent with various apparatuses and methods of the prior art. The invention presents a calibrator apparatus for use with granular broadcast spreaders which permits rapid and accurate spreader calibration employing agricultural materials.

SUMMARY OF THE INVENTION

In accordance with the present invention, a device for use in the calibration of granular rotary broadcast spreaders is presented. The invention is easily installed on and removable from such broadcast spreaders. A preferred embodiment of the invention comprises an enclosed two-piece central collection component which is easily assembled and disassembled which encompasses the impeller of the spreader, and a removable weighing pan.

OBJECTS OF THE INVENTION

An object of this invention is to develop a calibration apparatus for use with granular rotary broadcast spreaders.

It is also an object of the invention to develop a calibrator which is easily installed and removed from rotary broadcast spreaders.

It is a further object of the invention to develop a calibrator which is reusable and suitable for conventional broadcast spreaders in the agricultural industry. These and other objects and advantages of the invention will become readily apparent from the following description and are particularly delineated in the appended claims.

Advantages of the present invention over the prior art and a better understanding of the invention and its use will become more apparent from the following disclosure in conjunction with the accompanying drawings wherein are set fully by way of illustration and example, a certain embodiment of the invention.

DESCRIPTION OF THE PREFERRED EMBODIMENTS

A detailed embodiment of the present invention is herein disclosed. However, it is understood that the disclosed preferred embodiment is merely illustrative of the invention which may be embodied in various forms. Accordingly, specific structural and functional details disclosed herein are not to be interpreted as limiting, but merely as support for the invention as claimed and as a representative example for teaching one skilled in the art to variously employ the present invention in any appropriately detailed structure.

Figure 1A:
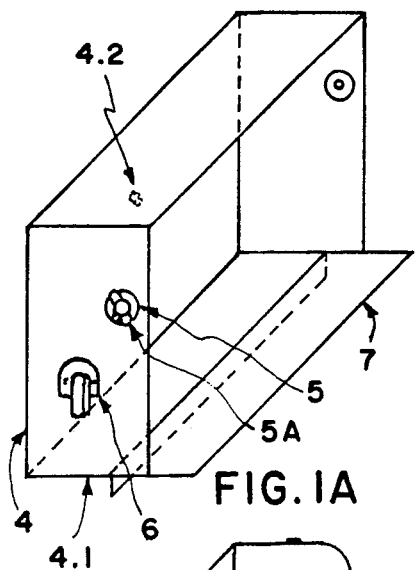
FIGS. 1A-1C, collectively referred to as FIG. 1, show when taken together a side elevational view of the calibrator of the present invention with disassembled components.
Figure 1B:
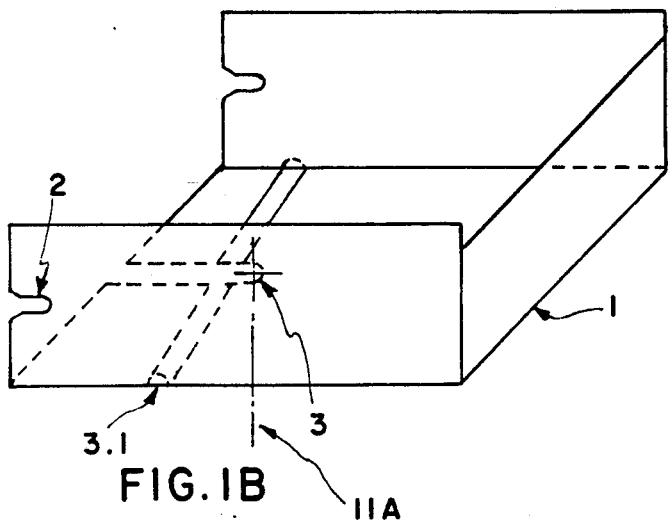
Figure 1C:
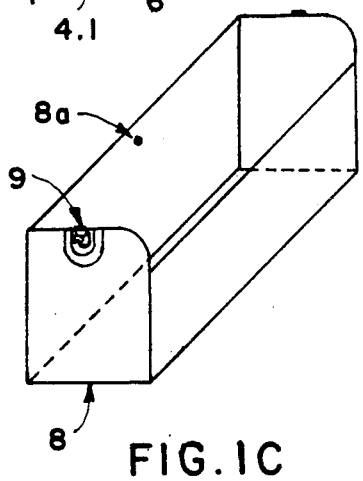

Referring to the drawings in more detail, FIG. 1 shows three components of the calibrator of the invention which are designed for easy installation on a rotary broadcast spreader and for easy disassembly, storage, and cleaning. The components of FIG. 1 are preferably constructed of 22 gauge galvanized steel, but can easily be made of various other materials (i.e., plastics, etc.) having sufficient structural integrity to perform collection functions. Although less substantial construction materials (i.e., cardboard, lightweight plastics, etc.) could be used, they would not be expected to be long-lasting. It is contemplated that such materials would be of selective advantage for disposable calibrators. The calibrator is designed for attachment to standard rotary broadcast spreaders. Reference numeral 1 of FIG. 1B is the primary calibrator component for collection of material dispensed by the spreader with which the calibrator is used. This component 1 is open on the top and the front and attaches to the cap unit 4 of FIG. 1A, which in turn attaches to the weighing pan 8 of FIG. 1C. The assembled calibrator of FIG. 1 is of sufficient height, width, and length so as to fit within the undercarriage of the broadcast spreader with which it is employed and to be conveniently carried on the spreader when it is in operation and to not interfere with the operation of same.

Figure 2:
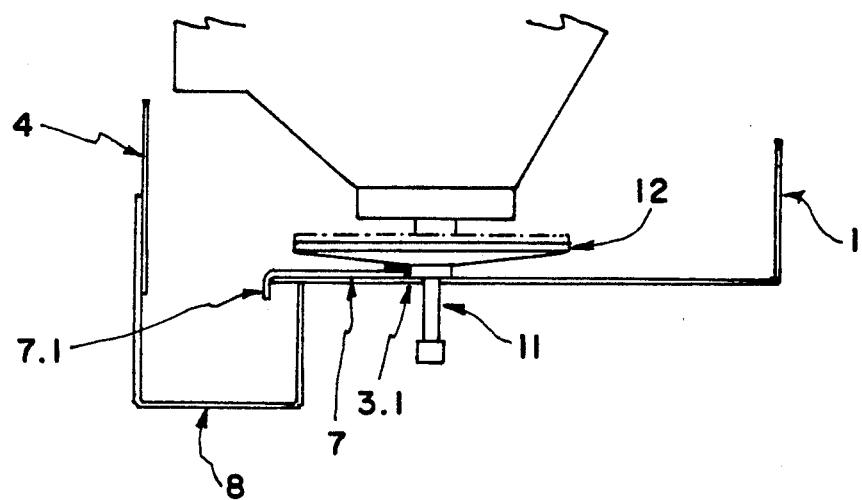
FIG. 2 is a cut-away view of the assembled calibrator.

In FIG. 1A, the cap unit 4 is enclosed on all sides, except the open side which joins with primary collector component 1, and the opening 4.1. The cap unit 4 fits inside collector 1 and conveniently slides forward until the lower ledge 7 covers the opening of groove 3 and approximates the impeller drive axle (as shown in FIGS. 2 and 3, reference numeral 11; and its axis line 11A of FIG. 1B) and the stud 5 contacts the end of groove 2. The lower ledge 7 slides under containment clip 3.1. Conveniently, a wing nut 5A is attached to threaded stud 5 and tightened to secure the cap unit 4 to the collector unit 1. The ledge 7 conveniently has a lip 7.1 which boarders the opening 4.1 and which contacts with the collector 1 when cap unit 4 is assembled with collector 1. An alignment clamp 6 is affixed to cap unit 4 and closes and secures weighing pan 8 to cap unit 4 when snapped shut with hook 9.

Weighing pan 8 is designed to attach to cap unit 4 and is aligned with same when stud 4.2 is placed into hole 8a. Thereafter, clamp 6 is attached to hook 9 thus securing the weighing pan 8 to cap unit 4.

Figure 3A:
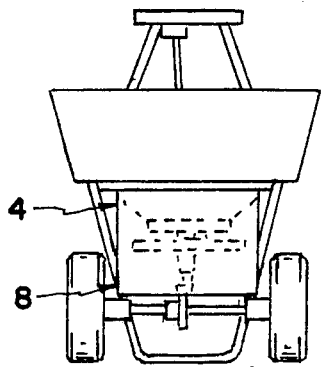
FIGS. 3A-3C respectively represent a rotary broadcast spreader showing front, lateral, and rear views.
Figure 3B:
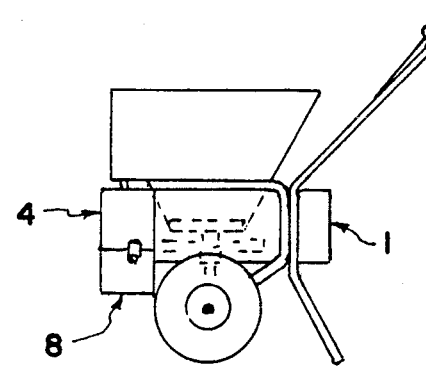
Figure 3C:
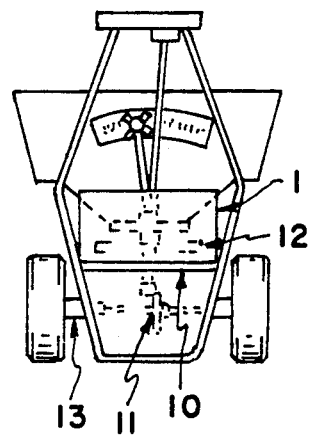

FIG. 3 is a rotary broadcast spreader for use in the application of granular materials to the soil surface with the calibrator of FIG. 1 installed. FIG. 3A is a front view of the spreader. FIG. 3B is a side view of the spreader. FIG. 3C is a rear view of the spreader. In FIG. 3C, reference numeral 11 is the impeller drive axle, 12 is the impeller, 13 is the wheel axle, and 10 is the frame of the spreader. FIG. 3B shows an installed calibrator, the components of which are shown in FIG. 1. Numeral 4 is the cap unit; numeral 1 is the collector unit; and numeral 8 is the weighing pan.

In the installation of the calibrator of FIG. 1 on the rotary broadcast spreader of FIG. 3, the collector 1 is conveniently placed from the rear of the spreader of FIG. 3 so that the impeller drive axle 11 fits into the groove 3. The collector 1 then rests upon the frame 10 and encloses the impeller 12. Then the cap unit 4 assembly is fitted from the front of the spreader of FIG. 3 onto the collector 1 and aligned by inserting stud 5 into groove 2 and secured by closing wing nut 5A. The lip 7.1 conveniently contacts the lower edge of collector 1 and the ledge 7 slider under the containment clip 3.1 and helps secure the collector 1 to the cap unit 4. Thereafter, the weighing pan 8 is joined to the cap unit 4 by inserting the stud 4.2 into the hole 8a and locking clamp 6 to hook 9.

FIG. 2 is a cut-away view of the assembled calibrator of FIG. 1 wherein numeral 4 is the cap unit, numeral 7 is the lower ledge of the cap unit; numeral 7.1 is the lip of the cap unit; numeral 8 is the weighing pan; numeral 12 is the impeller; and numeral 11 is the impeller drive axle; and numeral 3.1 is the containment clip.

In the use of the calibration device of the invention, the spreader can then be filled with appropriate granular material and a spreader setting selected. The spreader can then be pushed a short distance delivering the material to the intended crop to determine the effective width of coverage. The components of the calibrator are assembled and installed on the rotary broadcast spreader as described above. The spreader is then run over a known distance. The granular material in question which would normally have been spread on the soil surface is then collected by the calibrator device. Upon completion of a test run of the spreader, the spreader is conveniently tipped forward away from the handler by raising the handle of the spreader up, thus causing the collected granular material to flow into the weighing pan 8. The weighing pan 8 is then removed from the cap unit 4 and the weight of the dispensed granular material determined. This procedure can then be repeated as necessary with various spreader settings and agricultural materials. Once a spreader has been calibrated for particular materials (seed, fertilizer, pesticide, etc.) and the calibration settings recorded, desired application rates of granular agricultural materials can then be accurately effected.

After calibration of the rotary broadcast spreader, the calibrating device of the invention can be discarded or cleaned and reused as necessary. Although the calibrator is preferably constructed of material suitable for repeated uses, the use of inexpensive construction materials would permit one-time throw away or limited-use devices.

It is understood that while one preferred form of this invention has been illustrated and described, the invention is not intended to be limited to the specific form or arrangement of parts herein described and shown and that various modifications within the scope of the invention will be apparent to those skilled in the art.

Thus is described my invention and the manner and process of making and using it in such full, clear, concise, and exact terms so as to enable any person skilled in the art to which it pertains, or with which it pertains, or with which it is most nearly connected, to make and use the same.

What is claimed is:

1. A calibration device for determining the output of granular materials from broadcast agricultural spreaders comprising:
   (a) a rigid elongate container for collecting granular material discharged from a broadcast spreader enclosing the impeller of said spreader and having a distal opening in a bottom thereof for removal of said discharged material and having an essentially open top and adapted on the bottom surface to encircle an impeller drive axle of said spreader thus containing discharged material, and
   (b) a rigid weighing pan which is open on a top thereof and which is removably attached to the container and is capable of receiving granular material deposited in the elongate container.

2. A calibration device according to claim 1 wherein said elongate container comprises at least two joinable components, one of which has the bottom opening.

3. A calibration device according to claim 2 wherein said joinable components are readily attached and detached.

4. A calibration device according to claim 3 wherein the joinable component having the bottom opening has a lower ledge which extends into said other component and when joined together with said other component on said broadcast spreader essentially encloses the impeller drive axle.

5. A calibration device for determining the output of granular materials from broadcast agricultural spreaders and adapted to fit within a lower framework of said spreader, and which is supported by or contained by said framework, comprising:
   (a) a principal rigid elongate rectangular container which is open at a top thereof and at one end, and which contains a central groove on a lower surface thereof which accommodates an impeller drive axle of said broadcast spreader, and which is of sufficient size so as to contain the impeller of said broadcast spreader; and
   (b) a rectangular cap unit which joins with said principle container and can be easily attached and detached from same, which is open on a side joining the principal container and which has an opening in bottom surface thereof for removal of collected granular material discharged from said spreader; and
   (c) a rectangular weighing box which joins to said cap unit and can be easily attached and detached from same, and which is open on a top surface thereof so as to permit the flow and collection of granular materials discharged by said spreader.

6. A calibration device according to claim 5 wherein said cap unit is form-fitted to said principle container and slides inside same, and wherein said cap unit has a lower protruding ledge which when installed encloses the impeller drive axle, and wherein said cap unit has a downward protruding lip on the lower ledge which contacts with the lower surface of principle container when installed on the spreader and which contains at least one stud for securing said weighing box.

7. A calibration device according to claim 6 wherein said weighing box is form-fitted to said cap unit and slides outside of and partially overlaps same and which contains at least one hole for receipt of at least one stud on said cap unit and a snap closure device for attachment to said cap unit.

8. A calibration device according to claim 6 wherein said principal container additionally has a containment clip for securing said cap unit.

* * * * *